(12) United States Patent
Li

(10) Patent No.: US 11,086,190 B2
(45) Date of Patent: Aug. 10, 2021

(54) OPTICALLY DRIVABLE GLASS DEVICE

(71) Applicants: Beijing BOE Technology Development Co., Ltd., Beijing (CN); BOE Technology Group Co., Ltd., Beijing (CN)

(72) Inventor: Wenbo Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 168 days.

(21) Appl. No.: 16/554,728

(22) Filed: Aug. 29, 2019

(65) Prior Publication Data

US 2020/0225557 A1    Jul. 16, 2020

(30) Foreign Application Priority Data

Jan. 14, 2019    (CN) .......................... 201910033130.8

(51) Int. Cl.
*G02F 1/29* (2006.01)
*G02F 1/13* (2006.01)
*G02B 26/02* (2006.01)
*G02F 1/1333* (2006.01)

(52) U.S. Cl.
CPC ............... *G02F 1/29* (2013.01); *G02B 26/02* (2013.01); *G02F 1/1323* (2013.01); *G02B 26/023* (2013.01); *G02F 1/133305* (2013.01); *G02F 2202/09* (2013.01)

(58) Field of Classification Search
CPC ...................................................... G02B 26/02
See application file for complete search history.

(56) References Cited

U.S. PATENT DOCUMENTS

2008/0259253 A1 * 10/2008 Broer ..................... G02B 26/02
349/86

* cited by examiner

*Primary Examiner* — Alexander P Gross
(74) *Attorney, Agent, or Firm* — Arent Fox LLP; Michael Fainberg

(57) ABSTRACT

The disclosure provides an optically drivable glass device including: a substrate; a windable stacked layer arranged on the substrate, where one end of the windable stacked layer is installed on the substrate, and the windable stacked layer includes a driving layer formed of an ultraviolet rays-sensitive and deformable material, and a flexible substrate layer with a light absorbing or reflecting function, where an initial state of the driving layer is a flat state; and an ultraviolet light source configured to provide the windable stacked layer with a light source, where the driving layer is configured to change from the flat state to a curled state under an ultraviolet radiation environment; and the driving layer is configured to change from the curled state to the flat state under an ultraviolet radiation-free environment.

15 Claims, 1 Drawing Sheet

OPTICALLY DRIVABLE GLASS DEVICE

CROSS-REFERENCE TO RELATED APPLICATION

This application claims priority to Chinese Patent Application No. 201910033130.8, filed on Jan. 14, 2019, which is hereby incorporated by reference in its entirety.

FIELD

The present disclosure relates to the field of intelligently controllable glass devices, and particularly to an optically drivable glass device.

BACKGROUND

An intelligently electrically-controllable and optically-adjustable glass device has been increasingly applied in the field of buildings and traffics because the glass device can be made transparent and light-shielding under different conditions.

In the related art, the state of the intelligently optically-adjustable glass device is generally adjusted in an electrically controllable mode, where when the glass device is powered on, liquid crystal molecules in the glass device are arranged in order so that the glass device appears transparent; and when the glass device is powered off, the liquid crystal molecules in the glass device are distributed non-uniformly so that the glass device appears opaque.

SUMMARY

An embodiment of the disclosure provides an optically drivable glass device which can be controlled to be transparent or light-shielding using an ultraviolet light source, so as to control the glass device precisely at a lower cost while saving power consumption.

In order to attain the object above, an embodiment of the disclosure provides an optically drivable glass device including: a substrate; a windable stacked layer arranged on the substrate, where one end of the windable stacked layer is installed on the substrate, and the windable stacked layer includes a driving layer formed of an ultraviolet rays-sensitive and deformable material, and a flexible substrate layer with a light absorbing function or a light reflecting function, where an initial state of the driving layer is a flat state; and an ultraviolet light source configured to provide the windable stacked layer with a light source, where: the driving layer is configured to change from the flat state to a curled state under an ultraviolet radiation environment; and the driving layer is configured to change from the curled state to the flat state under an ultraviolet radiation-free environment.

In some embodiments, the flexible substrate layer is located on a first side of the driving layer facing the substrate.

In some embodiments, the ultraviolet light source is arranged between the substrate and one end of the windable stacked layer.

In some embodiments, the ultraviolet light source is connected with the driving layer via a bonding agent.

In some embodiments, a first refractive index $n_1$ of the flexible substrate layer, a second refractive index $n_2$ of the driving layer, and a third refractive index $n_3$ of the substrate satisfy $n_2 > n_1$ and $n_2 > n_3$; and an incident angle $\theta_1$ at which the ultraviolet light source is incident on a second side of the driving layer facing the ultraviolet light source satisfies:

$$\theta_1 \geq \sin^{-1} \frac{n_3}{n_2}.$$

In some embodiments, the optically drivable glass device further includes an insulation layer located on a side of the windable stacked layer facing the substrate, and a first refractive index $n_1$ of the flexible substrate layer, a second refractive index $n_2$ of the driving layer, and a fourth refractive index $n_4$ of the insulation layer satisfy $n_2 > n_1$ and $n_2 > n_4$; and an incident angle $\theta_1$ at which the ultraviolet light source is incident on a second side of the driving layer facing the ultraviolet light source satisfies:

$$\theta_1 \geq \sin^{-1} \frac{n_4}{n_2}.$$

In some embodiments, the ultraviolet light source is arranged on a side of the substrate away from the windable stacked layer connected with the substrate, and a plurality of net dots are arranged on a surface of the substrate away from the windable stacked layer.

In some embodiments, a first refractive index $n_1$ of the flexible substrate layer, a second refractive index $n_2$ of the driving layer, and a third refractive index $n_3$ of the substrate satisfy $n_2 > n_1$ and $n_2 > n_3$; and an incident angle $\theta_2$ at which the ultraviolet light source is incident on a second side of the substrate facing the ultraviolet light source satisfies:

$$\theta_2 \geq \sin^{-1} \frac{n_3}{n_2}.$$

In some embodiments, the optically drivable glass device further includes an insulation layer located on a side of the windable stacked layer facing the substrate, and a first refractive index $n_1$ of the flexible substrate layer, a second refractive index $n_2$ of the driving layer, and a fourth refractive index $n_4$ of the insulation layer satisfy $n_2 > n_1$ and $n_2 > n_4$; and an incident angle $\theta_2$ at which the ultraviolet light source is incident on a second side of the substrate facing the ultraviolet light source satisfies:

$$\theta_2 \geq \sin^{-1} \frac{n_4}{n_2}.$$

In some embodiments, the ultraviolet light source is arranged externally to provide the driving layer with the light source in a scanning mode.

In some embodiments, a material of the driving layer is an azo material.

Figure 1:
FIG. 1 is a schematic structural diagram of the electrically-controllable and optically-adjustable glass device in the prior art.

List of reference numerals: 101—substrate; 102—first electrode layer; 103—insulation dielectric layer; 104—windable thin film curtain; 105—flexible optical function layer; 106—second electrode layer; 201—substrate; 2011—net dot; 202—windable stacked layer; 2021—flexible substrate layer; 2022—driving layer; 203—ultraviolet light source; 204—bonding agent; 205—insulation layer.

DETAILED DESCRIPTION OF THE EMBODIMENTS

The technical solutions according to the embodiments of the disclosure will be described below clearly and fully with reference to the drawings in the embodiments of the disclosure. Apparently the embodiments to be described are only a part but all of the embodiments of the disclosure. Based upon the embodiments here of the disclosure, all of other embodiments which can occur to those ordinarily skilled in the art without any inventive effort shall come into the claimed scope of the disclosure.

As illustrated in FIG. 1, an operating principle of an intelligently electrically-controllable and optically-adjustable glass device in the related art is as follows: the intelligently electrically-controllable and optically-adjustable glass device includes a substrate 101, a first electrode layer 102, an insulation dielectric layer 103, a windable thin film curtain 104, a flexible optical function layer 105, and a second electrode layer 106. When the intelligently electrically-controllable and optically-adjustable glass device is not powered on, all of the windable thin film curtain 104, the flexible optical function layer 105 and the second electrode layer 106 are in a flat state; and when intelligently electrically-controllable and optically-adjustable glass device is powered on, the windable thin film curtain 104, the flexible optical function layer 105, and the second electrode layer 106 are curled and deformed, that is, the intelligently electrically-controllable and optically-adjustable glass device can be electrically controlled to operate in different states.

However since a power supply is necessary to the intelligently electrically-controllable and optically-adjustable glass device in operation, the glass device can not operate normally when there is no power supply in an operating environment of the glass device; and since the windable thin film curtain 104, the flexible optical function layer 105, and the second electrode layer 106 come into contact with each other, the materials of the flexible optical function layer 105 and the second electrode layer 106 shall have different thermal expansion coefficients, so the glass device can not be controlled precisely. There is a high cost of the intelligently electrically-controllable and optically-adjustable glass device.

Figure 2:
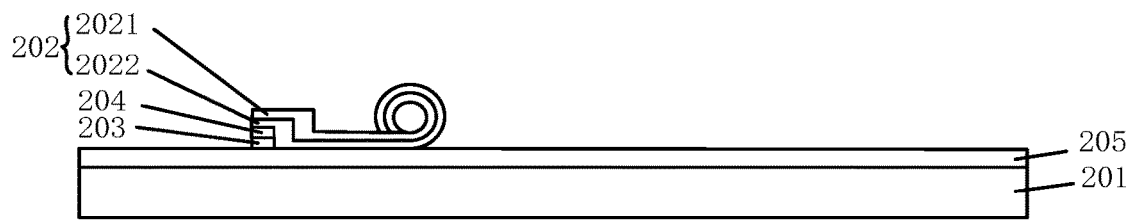
FIG. 2 is a schematic structural diagram of an optically drivable glass device according to an embodiment of the disclosure.

In order to address the problem above, as illustrated in FIG. 2, an embodiment of the disclosure provides an optically drivable glass device including: a substrate 201; a windable stacked layer 202 arranged on the substrate 201, and an ultraviolet light source 203 configured to provide the windable stacked layer 202 with a light source. One end of the windable stacked layer 202 is installed on the substrate 201, and the windable stacked layer 202 includes a driving layer 2022 formed of an ultraviolet rays-sensitive and deformable material, and a flexible substrate layer 2021 with a light absorbing function or a light reflecting function, an initial state of the driving layer 2022 is a flat state. The ultraviolet rays-sensitive and deformable material can be UV Curable Resin, etc.

When the driving layer 202 is in an ultraviolet radiation environment, the driving layer 202 is changed from the flat state to a curled state due to the ultraviolet rays so that the windable stacked layer 202 in the curled state; and when the driving layer 2022 is in an ultraviolet radiation-free environment, the driving layer 202 is recovered from the curled state to the flat state so that the windable stacked layer 2 is recovered from the curled state to the flat state.

In the optically drivable glass device according to the embodiment of the disclosure, the windable stacked layer 202 includes the driving layer 2022 formed of the ultraviolet rays-sensitive and deformable material, and the flexible substrate layer 2021 with the light absorbing or reflecting function, and when the windable stacked layer 20 is in the ultraviolet radiation environment, the orientation structure of the driving layer 2022 is changed so that microscopic structural molecules thereof are changed from the original planar orientation to the vertical orientation, and macroscopically the driving layer 2022 is changed from the initial flat state to the curled state so that the windable stacked layer 202 is curled, and at this time, the optically drivable glass device is transparent; and when the ultraviolet light source is removed, the microscopic structural molecules is restored to the original planar orientation, so that the driving layer 2022 is restored from the curled state to the flat state, and the windable stacked layer 202 is also restored to the flat state, and at this time, the optically drivable glass device is light-shielding.

Accordingly in the optically drivable glass device according to the embodiment of the disclosure, the ultraviolet light source 203 is arranged so that the driving layer 2022 can be switched between the flat and curled states, and thus the optically drivable glass device can be made transparent and light-shielding. Since the ultraviolet light source 203 does not come into contact with the driving layer 2022, the optically drivable glass device can be controlled precisely by adjusting parameters of the light source; and the optically drivable glass device above can be applied more widely because it can operate normally without any power supply, and it can be produced at a lower material cost; and power can be saved because it operates without any power supply.

In some embodiments, the flexible substrate layer 2021 is located on a first side of the driving layer 2022 facing the substrate 201, that is, the driving layer 2022 is located on the side on which the ultraviolet rays are incident, so that the ultraviolet rays of the ultraviolet light source 203 can be incident on the largest area of the driving layer 2022, and thus the glass device can be controlled more precisely.

The position of the ultraviolet light source 203 can be adjustable particularly as needed in reality, but will not be limited to the position as described in the embodiment of the disclosure by way of an example, and any modifications and variations thereto which can made without departing from the spirit of the disclosure shall fall into the scope of the disclosure as claimed.

As illustrated in FIG. 2, the ultraviolet light source 203 is arranged between the substrate and one end of the windable stacked layer 202, and when the ultraviolet light source 203 is switched on, the light rays are incident on the driving layer 2022 so that the driving layer 2022 is changed from the initial flat state to the curled state, and the windable stacked layer 202 is also curled; and when the ultraviolet light source 203 is removed, the driving layer 2022 is recovered from the curled state to the flat state, and the windable stacked layer 202 is also recovered to the flat state.

In some embodiments, the ultraviolet light source 203 is connected with the driving layer 2022 using a bonding agent 204, and fixed on the substrate 201.

Furthermore a first refractive index $n_1$ of the flexible substrate layer, a first refractive index $n_2$ of the driving layer 2022, and a first refractive index $n_3$ of the substrate 201 satisfy $n_2 > n_1$ and $n_2 > n_3$, and an incident angle $\theta_1$ at which the ultraviolet light source 203 is incident on a second side of the driving layer 2022 facing the ultraviolet light source 203 satisfies:

$$\theta_1 \geq \sin^{-1} \frac{n_3}{n_2}.$$

When this condition is satisfied, the ultraviolet rays can be totally reflected between the substrate 201 and the flexible substrate layer 2021 so that the ultraviolet rays can come into sufficient contact with the driving layer 2022 to thereby control the state of the driving layer 2022 precisely so as to adjust the state of the glass device.

Moreover the optically drivable glass device in this implementation can further include an insulation layer 205 located on the side of the windable stacked layer 202 facing the substrate 201. The insulation layer 205 can be arranged to protect in effect the substrate 201, and the structure of the windable stacked layer 202 to thereby prolong the service lifetime of the glass device.

Furthermore the first refractive index $n_1$ of the flexible substrate layer 2021, the second refractive index $n_2$ of the driving layer 2022, and a fourth refractive index $n_4$ of the insulation layer 205 satisfy $n_2 > n_1$ and $n_2 > n_4$, and the angle $\theta_1$ at which the ultraviolet light source 203 is incident on the side of the driving layer 2022 facing the ultraviolet light source 203 satisfies:

$$\theta_1 \geq \sin^{-1} \frac{n_4}{n_2}.$$

When this condition is satisfied, the ultraviolet rays can be totally reflected between the insulation layer 205 and the flexible substrate layer 2021 so that the ultraviolet rays can come into sufficient contact with the driving layer 2022 to thereby control the state of the driving layer 2022 precisely so as to adjust the state of the glass device.

Figure 3:
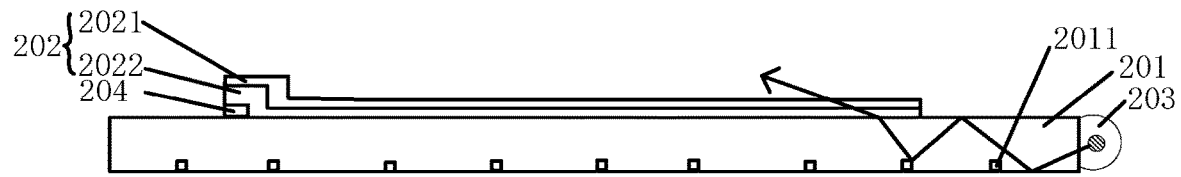
FIG. 3 is a schematic structural diagram of an optically drivable glass device according to another embodiment of the disclosure.

As illustrated in FIG. 3, in a second implementation, the ultraviolet light source 203 is arranged on the side of the substrate 201 away from the windable stacked layer 202 connected with the substrate 201, and a plurality of net dots 2011 are arranged on the surface of the substrate 201 on the side thereof away from the windable stacked layer 202. When the light rays of the ultraviolet light source 203 are reflected in the substrate 201, the light rays passing the net dots 2011 can exit the surface of the substrate 201, and be incident on the driving layer 2022 so that the driving layer 2022 is changed from the initial flat state to the curled state, and the windable stacked layer 202 is also curled; and when the ultraviolet light source 203 is removed, the driving layer 2022 is recovered from the curled state to the flat state, and the windable stacked layer 202 is also recovered to the flat state.

Furthermore the first refractive index $n_1$ of the flexible substrate layer 2021, the second refractive index $n_2$ of the driving layer 2022, and the third refractive index $n_3$ of the substrate 201 satisfy $n_2 > n_1$ and $n_2 > n_3$, and the incident angle $\theta_2$ at which the ultraviolet light source 203 is incident on the side of the substrate 201 facing the ultraviolet light source 203 satisfies:

$$\theta_2 \geq \sin^{-1} \frac{n_3}{n_2}.$$

When this condition is satisfied, the ultraviolet rays can be totally reflected between the substrate 201 and the flexible substrate layer 2021 so that the ultraviolet rays can come into sufficient contact with the driving layer 2022 to thereby control the state of the driving layer 2022 precisely so as to adjust the state of the glass device.

Moreover the optically drivable glass device in this implementation can further include an insulation layer 205 located on the side of the windable stacked layer 202 facing the substrate 201, where the first refractive index $n_1$ of the flexible substrate layer 2021, the second refractive index $n_2$ of the driving layer 2022, and the forth refractive index $n_4$ of the insulation layer 205 satisfy $n_2 > n_1$ and $n_2 > n_4$, and the angle $\theta_2$ at which the ultraviolet light source 203 is incident on the side of the substrate 201 facing the ultraviolet light source 203 satisfies:

$$\theta_2 \geq \sin^{-1} \frac{n_4}{n_2}.$$

When this condition is satisfied, the ultraviolet rays can be totally reflected between the insulation layer 205 and the flexible substrate layer 2021 so that the ultraviolet rays can come into sufficient contact with the driving layer 2022 to thereby control the state of the driving layer 2022 precisely so as to adjust the state of the glass device.

Figure 4:
FIG. 4 is a schematic structural diagram of an optically drivable glass device according to a further embodiment of the disclosure.

As illustrated in FIG. 4, in a third implementation, the ultraviolet light source 203 is arranged externally to provide the driving layer 2022 with a light source in a scanning mode. When the ultraviolet light source 203 is incident on the driving layer 2022 in the scanning mode, there is such a large scanning range that more light rays can be incident on the driving layer 2022 so as to control the glass device more precisely.

In some embodiments, the material of the driving layer 2022 can be an azo material, and since the azo material has a low cost, high optical sensitivity, and stable photo-electricity, the optically drivable glass device according to the embodiment of the disclosure can be made at a lower cost.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:
1. An optically drivable glass device, comprising:
a substrate;
a windable stacked layer arranged on the substrate, wherein one end of the windable stacked layer is installed on the substrate, and the windable stacked layer comprises a driving layer formed of an ultraviolet rays-sensitive and deformable material, and a flexible substrate layer with a light absorbing function or a light reflecting function, wherein an initial state of the driving layer is a flat state; and an ultraviolet light source configured to provide the windable stacked layer with a light source;

wherein the driving layer is configured to change from the flat state to a curled state under an ultraviolet radiation environment; and the driving layer is configured to change from the curled state to the flat state under an ultraviolet radiation-free environment.

2. The optically drivable glass device according to claim 1, wherein the ultraviolet light source is arranged externally to provide the driving layer with the light source in a scanning mode.

3. The optically drivable glass device according to claim 1, wherein a material of the driving layer is an azo material.

4. The optically drivable glass device according to claim 1, wherein the flexible substrate layer is located on a first side of the driving layer facing the substrate.

5. The optically drivable glass device according to claim 4, wherein a material of the driving layer is an azo material.

6. The optically drivable glass device according to claim 1, wherein the ultraviolet light source is arranged on a side of the substrate away from the windable stacked layer connected with the substrate, and a plurality of net dots are arranged on a surface of the substrate away from the windable stacked layer.

7. The optically drivable glass device according to claim 6, wherein a first refractive index $n_1$ of the flexible substrate layer, a second refractive index $n_2$ of the driving layer, and a third refractive index $n_3$ of the substrate satisfy $n_2 > n_1$ and $n_2 > n_3$; and an incident angle $\theta_2$ at which the ultraviolet light source is incident on a second side of the substrate facing the ultraviolet light source satisfies:

$$\theta_2 \geq \sin^{-1} \frac{n_3}{n_2}.$$

8. The optically drivable glass device according to claim 6, wherein the optically drivable glass device further comprises an insulation layer located on a side of the windable stacked layer facing the substrate, and a first refractive index $n_1$ of the flexible substrate layer, a second refractive index $n_2$ of the driving layer, and a fourth refractive index $n_4$ of the insulation layer satisfy $n_2 > n_1$ and $n_2 > n_4$; and the angle $\theta_2$ at which the ultraviolet light source is incident on the side of the substrate facing the ultraviolet light source satisfies:

$$\theta_2 \geq \sin^{-1} \frac{n_4}{n_2}.$$

9. The optically drivable glass device according to claim 1, wherein the ultraviolet light source is arranged between the substrate and one end of the windable stacked layer.

10. The optically drivable glass device according to claim 9, wherein the optically drivable glass device further comprises an insulation layer located on a side of the windable stacked layer facing the substrate, and a first refractive index $n_1$ of the flexible substrate layer, a second refractive index $n_2$ of the driving layer, and a fourth refractive index $n_4$ of the insulation layer satisfy $n_2 > n_1$ and $n_2 > n_4$; and an incident angle $\theta_1$ at which the ultraviolet light source is incident on a second side of the driving layer facing the ultraviolet light source satisfies:

$$\theta_1 \geq \sin^{-1} \frac{n_4}{n_2}.$$

11. The optically drivable glass device according to claim 9, wherein a material of the driving layer is an azo material.

12. The optically drivable glass device according to claim 9, wherein the ultraviolet light source is connected with the driving layer via a bonding agent.

13. The optically drivable glass device according to claim 12, wherein a material of the driving layer is an azo material.

14. The optically drivable glass device according to claim 9, wherein a first refractive index $n_1$ of the flexible substrate layer, a second refractive index $n_1$ of the driving layer, and a third refractive index $n_3$ of the substrate satisfy $n_2 > n_1$ and $n_2 > n_3$; and an incident angle $\theta_1$ at which the ultraviolet light source is incident on a second side of the driving layer facing the ultraviolet light source satisfies:

$$\theta_1 \geq \sin^{-1} \frac{n_3}{n_2}.$$

15. The optically drivable glass device according to claim 14, wherein a material of the driving layer is an azo material.

* * * * *